United States Patent
Jia et al.

(10) Patent No.: US 10,515,441 B2
(45) Date of Patent: Dec. 24, 2019

(54) METHOD AND DEVICE FOR RECTIFYING IMAGE PHOTOGRAPHED BY FISH-EYE LENS

(71) Applicant: SHENZHEN ARASHI VISION COMPANY LIMITED, Shenzhen, Guangdong Province (CN)

(72) Inventors: Shun Jia, Shenzhen (CN); Jingkang Liu, Shenzhen (CN)

(73) Assignee: SHENZHEN ARASHI VISION COMPANY LIMITED, Shenzhen, Guangdong Province (CN)

( * ) Notice: Subject to any disclaimer, the term of this patent is extended or adjusted under 35 U.S.C. 154(b) by 65 days.

(21) Appl. No.: 15/570,357

(22) PCT Filed: Aug. 31, 2016

(86) PCT No.: PCT/CN2016/097637
§ 371 (c)(1),
(2) Date: Oct. 29, 2017

(87) PCT Pub. No.: WO2017/124759
PCT Pub. Date: Jul. 27, 2018

(65) Prior Publication Data
US 2018/0150944 A1  May 31, 2018

(30) Foreign Application Priority Data

Jan. 18, 2016 (CN) .......................... 2016 1 0032940

(51) Int. Cl.
*G06K 9/00* (2006.01)
*G06T 5/00* (2006.01)
(Continued)

(52) U.S. Cl.
CPC ............ *G06T 5/006* (2013.01); *G06T 3/0018* (2013.01); *G06T 3/0062* (2013.01);
(Continued)

(58) Field of Classification Search
CPC ..... G06T 3/0062; G06T 3/0018; G06T 5/006; G06T 3/4038; G06T 2200/32; G06T 5/50; G06T 2207/10024
See application file for complete search history.

(56) References Cited

U.S. PATENT DOCUMENTS 7,274,381 B2 *  9/2007  Mojaver ................... G06T 3/00
                                              345/427
8,125,537 B2 *  2/2012  Maekawa ................. G06T 3/00
                                              348/222.1
(Continued)

FOREIGN PATENT DOCUMENTS

CN      102509261 A     6/2012
CN      103268592 A     8/2013
(Continued)

*Primary Examiner* — Amir Alavi
(74) *Attorney, Agent, or Firm* — Cheng-Ju Chiang

(57) ABSTRACT

A method and device for rectifying an image photographed by a fish-eye lens, comprising the following steps: acquiring a fish-eye lens mapping parameter and a lens field angle; acquiring a fitted mapping curve according to the lens mapping parameter; acquiring centre coordinate and the radius of a fish-eye circle in a fish-eye image; creating a blank image used for rectifying the image according to the lens field angle; based on the lens field angle, the fitted mapping curve, the centre coordinate and the radius of the fish-eye circle, and the width and height of the blank image, mapping a point on the blank image used for rectifying the image to a corresponding point in the fish-eye image; and based on a colour sample of the corresponding point in the fish-eye image, drawing same onto the corresponding point in the blank image used for rectifying the image, and drawing the rectified image.

20 Claims, 6 Drawing Sheets

(51) Int. Cl.
*G06T 3/00* (2006.01)
*G06T 3/40* (2006.01)
*G06T 5/50* (2006.01)

(52) U.S. Cl.
CPC .............. *G06T 3/4038* (2013.01); *G06T 5/50* (2013.01); *G06T 2200/32* (2013.01); *G06T 2207/10024* (2013.01)

(56) References Cited

U.S. PATENT DOCUMENTS

| | | | |
|---|---|---|---|
| 9,710,919 B2 * | 7/2017 | Teng | G06T 7/20 |
| 9,740,942 B2 * | 8/2017 | Yamaguchi | G06K 9/00798 |
| 10,021,371 B2 * | 7/2018 | Pacheco | G06T 7/285 |
| 10,104,287 B2 * | 10/2018 | Satoh | G06T 3/0018 |
| 10,192,284 B2 * | 1/2019 | Lee | H04N 7/183 |
| 2013/0314444 A1 | 11/2013 | Iwamoto et al. | |
| 2017/0019605 A1 * | 1/2017 | Ahiska | H04N 5/217 |
| 2018/0150944 A1 * | 5/2018 | Jia | G06T 3/0062 |

FOREIGN PATENT DOCUMENTS

| | | |
|---|---|---|
| CN | 103996172 A | 8/2014 |
| CN | 104240236 A | 12/2014 |
| CN | 104778656 A | 7/2015 |

\* cited by examiner

METHOD AND DEVICE FOR RECTIFYING IMAGE PHOTOGRAPHED BY FISH-EYE LENS

CROSS REFERENCE TO RELATED APPLICATIONS

The present application is a 35 U.S.C. § 371 National Phase conversion of International (PCT) Patent Application No. PCT/CN2016/097637, filed on Aug. 31, 2016, the disclosure of which is incorporated by reference herein. The PCT International Patent Application was filed and published in Chinese.

FIELD OF THE INVENTION

The present invention relates to a rectifying method and rectifying device, and especially for a method and device for rectifying an image photographed by a fish-eye lens.

BACKGROUND OF THE INVENTION

A panorama image is a 360-degree image by stitching images photographed by a fish-eye lens using professional drawing tools of panorama image (such as panatools). The fish-eye lens is a wide-angle lens. As a usual definition, a lens with a view angle up to 180-degree is called as a fish-eye lens. The existing images photographed by a fish-eye lens usually become distorted, therefore, a method and device for rectifying an image photographed by a fish-eye lens is needed to rectify an image photographed by a fish-eye lens, so as to form an image with higher precision and further form a panorama image with higher precision.

FIG. 1 shows an imaging diagram of a fish-eye lens. As shown in FIG. 1, the incident light finally images on the film after refraction through the lens, the light through the optical axis directly images on the center of the image without refraction. The incident light with an incident angle θ will image on the film along the dotted line if not refracted, with a distance $r_{Ref}$ to the center of the film: $r_{Ref}=f \times \tan(\theta)$, wherein f is a distance between the focus of the lens and the film. In fact, the incident light with an incident angle θ will be refracted through lens, the refracted light will be mapped onto the film with a distance $r_{Real}$ to the center of the film, a function relationship between $r_{Real}$ and θ as $r_{Real}=F(\theta)$, and the function is called as a mapping curve of the lens. The mapping parameters of the lens can be obtained from the manufacturer.

Table 1 shows mapping parameters of a fish-eye lens from the manufacturer.

TABLE 1

| | | Lens Mapping Parameters | | |
|---|---|---|---|---|
| θ | $r_{Real}$ | $r_{Ref}$ | $r_{Real\ fitting}$ | Errors (%) |
| ... | ... | ... | ... | ... |
| 83.50000000 | 1.29173667 | 9.29066858 | 1.28731667 | −0.342174999 |
| 84.00000000 | 1.29651734 | 10.0713161 | 1.292040736 | −0.345279146 |
| 84.50000000 | 1.30124767 | 10.99333721 | 1.29671462 | −0.34836181 |
| 85.00000000 | 1.30592748 | 12.09914443 | 1.301338125 | −0.35142495 |
| 85.50000000 | 1.31055658 | 13.45000025 | 1.305911055 | −0.354469621 |
| 86.00000000 | 1.31513483 | 15.13779832 | 1.310433216 | −0.357500531 |
| 86.50000000 | 1.31966204 | 17.30694293 | 1.314904415 | −0.360518435 |
| 87.00000000 | 1.32413805 | 20.19810781 | 1.319324461 | −0.36352622 |
| 87.50000000 | 1.32856273 | 24.24450563 | 1.323693164 | −0.366528868 |
| 88.00000000 | 1.33293591 | 30.31256159 | 1.328010336 | −0.369528194 |
| 88.50000000 | 1.33725744 | 40.42393442 | 1.33227579 | −0.372527367 |
| 89.00000000 | 1.34152721 | 60.64360003 | 1.336489341 | −0.375532376 |
| 89.50000000 | 1.34574506 | 121.2964378 | 1.340650805 | −0.37854532 |
| 90.50000000 | 1.35402452 | −121.2964378 | 1.348816745 | −0.384614522 |
| 91.00000000 | 1.35808589 | −60.64360003 | 1.352820861 | −0.387680119 |
| 91.50000000 | 1.36209488 | −40.42393441 | 1.35677217 | −0.390773801 |
| 92.00000000 | 1.36605137 | −30.31256159 | 1.360670496 | −0.393899828 |
| 92.50000000 | 1.36995528 | −24.24450562 | 1.364515664 | −0.397065219 |
| 93.00000000 | 1.3738065 | −20.19810781 | 1.368307501 | −0.400274638 |
| 93.50000000 | 1.37760495 | −17.30694292 | 1.372045835 | −0.403534768 |
| 94.00000000 | 1.38135055 | −15.13779831 | 1.375730496 | −0.40685212 |
| 94.50000000 | 1.38504322 | −13.45000024 | 1.379361315 | −0.410233042 |
| 95.00000000 | 1.3886829 | −12.09914443 | 1.382938125 | −0.413685154 |
| ... | ... | ... | ... | ... |

Table 1 only shows the mapping parameters for some incident angles, while a complete table of the mapping parameter has a range of $$\left[0, \frac{fov}{2}\right],$$

including the mapping parameters every 0.5-degree incident angle; herein, fov is the lens field angle. Drawing scatter plot graphs according to the mapping parameter table, and then a fitting curve is obtained by linear regression. The fitting curve according to Table 1 is:

$$r_{Real}=F(\theta)=1.0\times10^{-9}\theta^4-6.0\times10^{-7}\theta^3+8.5\times10^{-6}\theta^2+ 0.0183\theta+0.0007 \quad \text{(Formula 1)}$$

by comparing the result calculated from the fitting curve with the real result, thus the Error:

$$\text{Error}=(r_{Real\,fitting}-r_{Real})/r_{Real}\times100\% \quad \text{(Formula 2)}$$

The Error of the fitting curve is less than 0.5%. Of course, the fitting curve of less error can be obtained by increasing the order of the polynomial.

Therefore, a method and device for rectifying an image photographed by a fish-eye lens is needed in the field for rectifying the images photographed by a fish-eye lens with an viewing angle over 180 degrees and with given parameters, so as to form an image with higher precision, and form a panorama image with higher precision by further stitching.

SUMMARY OF THE INVENTION

An object of the present invention is to provide a method and device for rectifying an image photographed by a fish-eye lens, which can rectify an image photographed by a fish-eye lens to overcome the disadvantages in the existing technology. Specifically, the objections of the present invention can be obtained by the following rectifying method and device.

A method for rectifying an image photographed by a fish-eye lens in accordance with an embodiment of the present invention, comprises steps of:

acquiring a fish-eye lens mapping parameter and a lens field angle;

acquiring a fitted mapping curve according to the lens mapping parameter;

acquiring centre coordinate and radius of a fish-eye circle in a fish-eye image;

creating a blank image used for rectifying the image according to the lens field angle;

based on the lens field angle, the fitted mapping curve, the centre coordinate and the radius of the fish-eye circle, and the width and height of the blank image, mapping a point on the blank image used for rectifying the image to a corresponding point in the fish-eye image; and based on a color sample of the corresponding point in the fish-eye image, drawing same onto the corresponding point in the blank image used for rectifying the image, and drawing the rectified image.

In the method for rectifying an image photographed by a fish-eye lens provided in accordance with the embodiment of the present invention, the step of acquiring a fitted mapping curve according to the lens mapping parameters specifically is: acquiring the fitted mapping curve by combining the lens mapping parameter with Formula 1, wherein θ is the incident angle, $r_{Real}$ is a distance to a center of a film from where the light at the incident angle θ is mapped on the film after being refracted through a lens.

In the method for rectifying an image photographed by a fish-eye lens provided in accordance with the embodiment of the present invention, the step of acquiring centre coordinate and radius of a fish-eye circle in a fish-eye image specifically is: acquiring centre coordinate $X_0$ and $Y_0$ and the radius 'R' of the fish-eye circle in a fish-eye image, wherein the fish-eye circle is the smallest circle capable of containing all the images in the fish-eye image.

In the method for rectifying an image photographed by a fish-eye lens provided in accordance with the embodiment of the present invention, the step of creating a blank image used for rectifying the image according to the lens field angle specifically is: setting a width W and a height h of the blank image according to a size of the image to be rectified, and that an aspect ratio (w:h) of the blank image used for rectifying the image is a fish-eye lens field angle fov:180.

In the method for rectifying an image photographed by a fish-eye lens provided in accordance with the embodiment of the present invention, wherein the step of based on the lens field angle, the fitted mapping curve, the centre coordinate and the radius of the fish-eye circle, and the width and height of the blank image, mapping a point on the blank image used for rectifying the image to a corresponding point in the fish-eye image, further comprises steps of:

step 5a: converting a coordinate (x, y) of a point on the blank image used for rectifying the image to a spherical coordinate $(x_1, y_1, z_1)$ based on the latitude and longitude mapping method;

step 5b: forming a new space coordinate (x', y', z') by rotating the converted spherical coordinate $(x_1, y_1, z_1)$ −90 degrees about the Y axis of the space coordinate; and step 5c: obtaining the coordinate (u, v) mapped in the fish-eye image based on the new space coordinate.

In the method for rectifying an image photographed by a fish-eye lens provided in accordance with the embodiment of the present invention, and in the above step 5a: an incident angle θ and a deviation angle φ can be calculated based on the coordinate (x, y) of a point on the blank image used for rectifying the image, the fish-eye lens field angle fov, and Formula 3 and Formula 4 described below; and the spherical coordinate $(x_1, y_1, z_1)$ can be calculated based on the angles θ and φ used in Formulas 5-7 described below.

In the method for rectifying an image photographed by a fish-eye lens provided in accordance with the embodiment of the present invention, and in the above step 5b, the space coordinate (x', y', z') can be obtained based on the converted spherical coordinate $(x_1, y_1, z_1)$ and Formula 8 described below.

In the method for rectifying an image photographed by a fish-eye lens provided in accordance with the embodiment of the present invention, and in the above step 5c, a converted incident angle θ' and a converted deviation angle φ' can be calculated based on Formulas 9-10 described below and the space coordinate (x', y', z'); the radius 'radius' can be calculated based on the angle θ', Formula 1, the lens field angle fov, and Formula 11 described below; and the coordinate (u, v) mapped in the fish-eye image can be calculated based on the angle φ', the center coordinates $x_0$ and $y_0$ of the fish-eye circle, the radius 'radius', and Formula 12 and Formula 13 described below.

A device for rectifying an image photographed by a fish-eye lens provided in accordance with another embodiment of the present invention, wherein, comprises:

a first data acquisition module, used for acquiring a fish-eye lens mapping parameter and a lens field angle;

a mapping curve fitting module, used for acquiring a fitted mapping curve according to the lens mapping parameter;

a second data acquisition module, used for acquiring a centre coordinate and radius of a fish-eye circle in a fish-eye image;

a blank image creation module, used for creating a blank image used for rectifying the image according to the lens field angle;

a mapping module, used for based on the lens field angle, the fitted mapping curve, the centre coordinate and the radius of the fish-eye circle, and the width and height of the blank image, mapping a point on the blank image used for rectifying the image to a corresponding point in the fish-eye image; and a drawing module, used for based on a color sample of the corresponding point in the fish-eye image, drawing same onto the corresponding point in the blank image used for rectifying the image, and drawing the rectified image.

The device for rectifying an image photographed by a fish-eye lens in accordance with another embodiment of the present invention, acquires a fitted mapping curve according to the lens mapping parameter by combining the acquired mapping parameter with Formula 1:

$$r_{Real}=F(\theta)=1.0\times10^{-9}\theta^4-6.0\times10^{-7}\theta^3+8.5\times10^{-6}\theta^2+0.0183\theta+0.0007$$

wherein $\theta$ is the incident angle, and $r_{Real}$ is a distance to a center of a film from where the light at the incident angle $\theta$ is mapped on the film after refracted through a lens.

The device for rectifying an image photographed by a fish-eye lens in accordance with another embodiment of the present invention, acquires the centre coordinate $X_0$ and $Y_0$ and the radius 'R' of the fish-eye circle in a fish-eye image; and the fish-eye circle is the smallest circle capable of containing all the images in the fish-eye image.

The device for rectifying an image photographed by a fish-eye lens in accordance with another embodiment of the present invention, sets a width W and a height h of the blank image according to a size of the image to be rectified; and an aspect ratio of the blank image used for rectifying the image is a fish-eye lens field angle fov: 180.

In the device for rectifying an image photographed by a fish-eye lens in accordance with another embodiment of the present invention, the mapping module further comprises modules of:

a first conversion module, used for converting a coordinate (x, y) of a point on the blank image used for rectifying the image to a spherical coordinate ($x_1$, $y_1$, $z_1$) based on the latitude and longitude mapping method;

a second conversion module, used for forming a new space coordinate (x', y', z') by rotating the converted spherical coordinate ($x_1$, $y_1$, $z_1$)–90 degrees about the Y axis of the space coordinate; and a third conversion module, used for obtaining the coordinate (u, v) mapped in the fish-eye image based on the new space coordinate.

In the device for rectifying an image photographed by a fish-eye lens in accordance with another embodiment of the present invention, the first conversion module calculates the incident angle $\theta$ and the deviation angle $\varphi$ based on the coordinates x and y of a point on the blank image used for rectifying the image, the fish-eye lens field angle fov, the width W and the height h of the blank image, and Formula 3 and Formula 4; calculates the spherical coordinate ($x_1$, $y_1$, $z_1$) based on the angles $\theta$ and $\varphi$ used in Formula 5, Formula 6 and Formula 7.

In the device for rectifying an image photographed by a fish-eye lens in accordance with another embodiment of the present invention, the second conversion module acquires the space coordinates x', y' and z' based on the converted spherical coordinate $x_1$, $y_1$ and $z_1$ and Formula 8.

In the device for rectifying an image photographed by a fish-eye lens in accordance with another embodiment of the present invention, the third conversion module calculates a converted incident angle $\theta'$ and a converted deviation angle $\varphi'$ based on Formulas 9-10 described below and the space coordinate (x', y', z'); and calculates the radius 'radius' based on the angle $\theta'$, Formula 1, the lens field angle fov, and Formula 11; and calculates the coordinate (u, v) mapped in the fish-eye image based on the angle $\varphi'$, the center coordinates $x_0$ and $y_0$ of the fish-eye circle, the radius 'radius', and Formula 12 and Formula 13.

The device for rectifying an image photographed by a fish-eye lens in accordance with another embodiment of the present invention, comprises at least one processing unit, and at least one memory unit; wherein, the memory unit is stored with program codes, when the program codes are executed by the processing unit, the processing unit will execute the method:

acquiring a fish-eye lens mapping parameter and a lens field angle;

acquiring a fitted mapping curve according to the lens mapping parameter;

acquiring centre coordinate and radius of a fish-eye circle in a fish-eye image;

creating a blank image used for rectifying the image according to the lens field angle;

based on the lens field angle, the fitted mapping curve, the centre coordinate and the radius of the fish-eye circle, and the width and height of the blank image, mapping a point on the blank image used for rectifying the image to a corresponding point in the fish-eye image; and based on a color sample of the corresponding point in the fish-eye image, drawing same onto the corresponding point in the blank image used for rectifying the image, and drawing the rectified image.

The method and device for rectifying an image photographed by a fish-eye lens of the present invention can rectify the distorted images photographed by a fish-eye lens, so as to form an image with higher precision, and further to form a panorama image with higher precision by stitching the rectified images.

DETAILED DESCRIPTION OF EMBODIMENTS

FIGS. 1-9 and the following description illustrate the optional embodiments of the present invention so as to teach the skilled in the art how to implement and recover the present invention. For teaching the technical solution of the present invention, some common aspects have been simplified. The skilled in the art can understand that spirit of variations or modifications made to the equivalent, should be covered within the scope of the present invention. It is understood that the following characters can become a variety of forms of the present invention by various combinations. Thereby, the present invention is not limited to the following optional embodiments. The scope of the present invention is defined by the appended claims and equivalents thereof.

Figure 6:
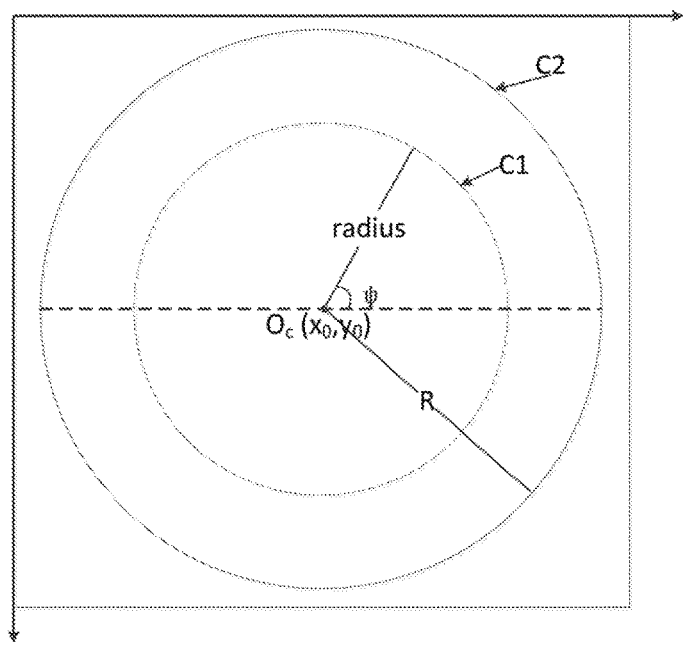
FIG. 6 illustrates a deviation angle, radius 'R' and 'radius'.

FIG. 6 illustrates a deviation angle, the radius 'R' and the radius 'radius'. The images on the film and the fish-eye images have an equal scale, a unit of the image on the film is mm, and the radius of the fish-eye image is pixel. The point imaged on the film of the light at the incident angle θ, accordingly forms a circle $C_1$ in the fish-eye image with a center $O_c(x_0,y_0)$ and the radius 'radius'. When θ=fov/2, that is, the light enters at the maximum incident angle, the circle imaged on the film corresponds to the circle in the fish-eye image with a center $O_c(x_0,y_0)$ and the radius 'R'. The deviation angle φ is a deviation angle that the point imaged on the film of the light at the incident angle θ corresponds to $C_1$ in the fish-eye image, and a range of φ is [0, 360].

Exemplary Method

Figure 1:
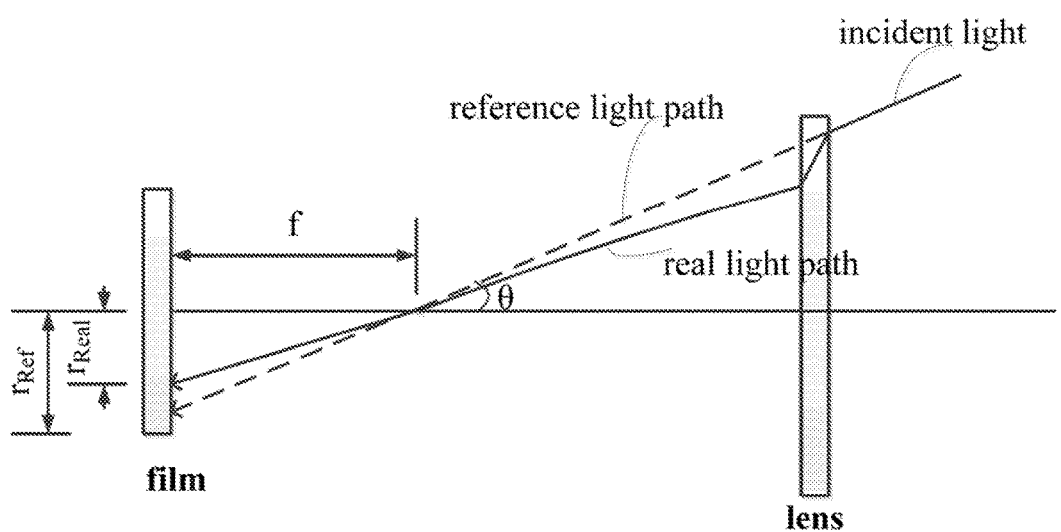
FIG. 1 illustrates an imaging diagram of a fish-eye lens.
Figure 2:
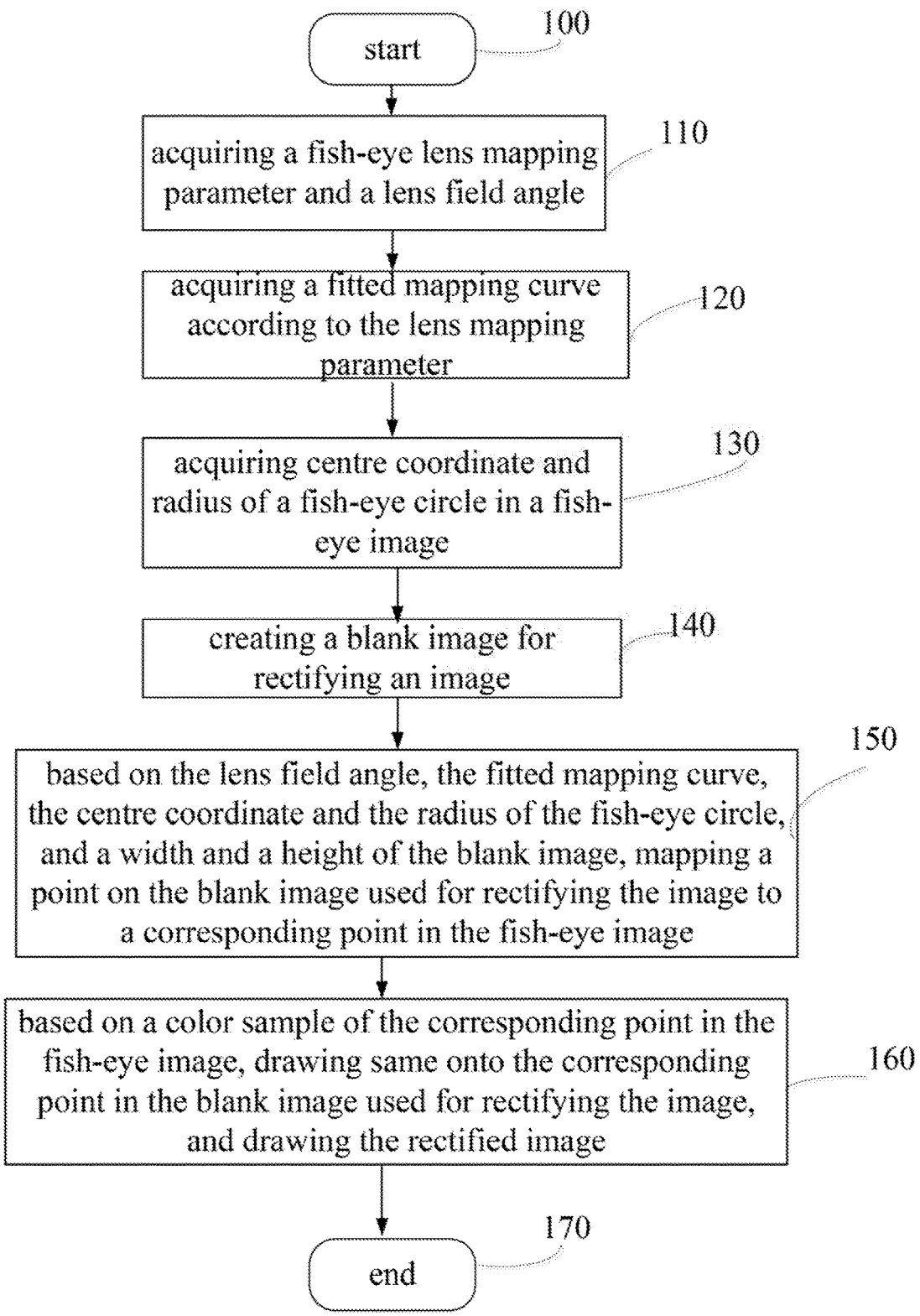
FIG. 2 illustrates a flow chart of a method for rectifying an image photographed by a fish-eye lens in accordance with an embodiment of the present invention.
Figure 3:
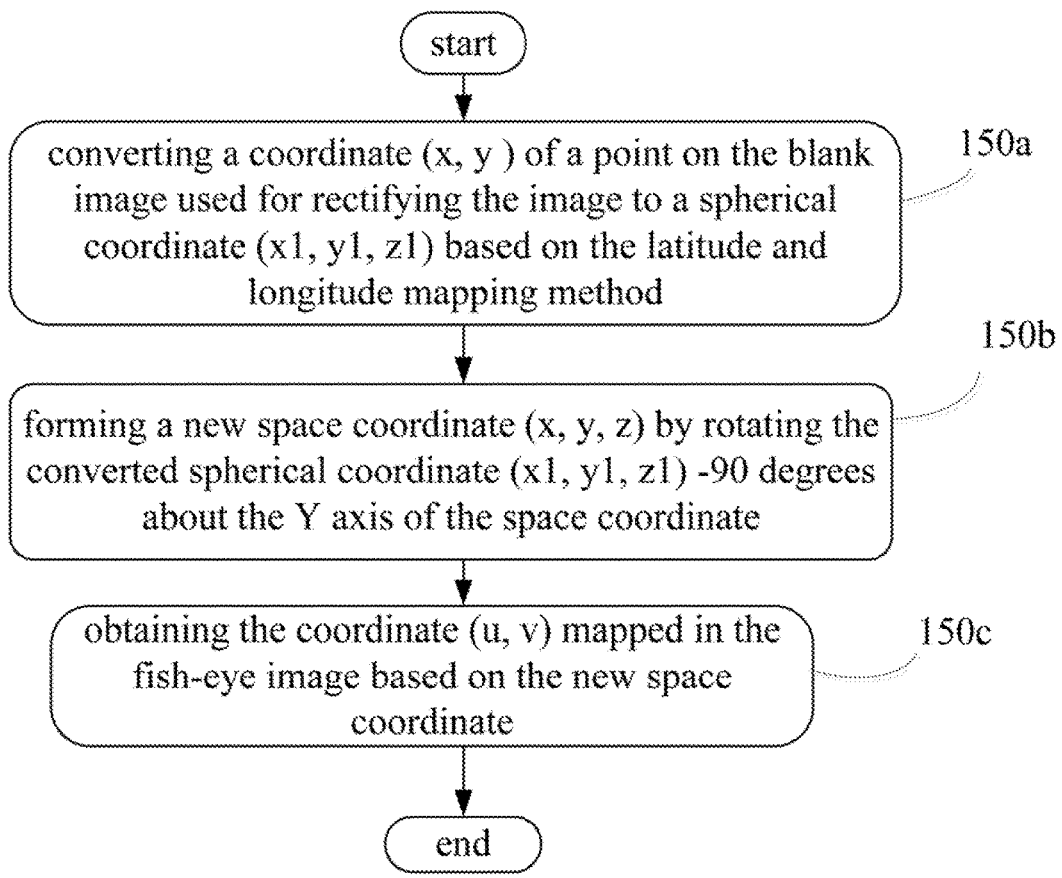
FIG. 3 illustrates the method for rectifying an image photographed by a fish-eye lens in accordance with an embodiment of the present invention.

FIG. 2 and FIG. 3 together illustrate a method for rectifying an image photographed by a fish-eye lens as an embodiment of the present invention. FIG. 2 illustrates a flow chart of a method for rectifying an image photographed by a fish-eye lens in accordance with an embodiment of the present invention. FIG. 3 illustrates an embodiment of the present invention of the method for rectifying an image photographed by a fish-eye lens. As shown in FIG. 2 and FIG. 3, a method for rectifying an image photographed by a fish-eye lens comprises steps of:

step 100: start of a method for rectifying an image photographed by a fish-eye lens in accordance with an embodiment of the present invention;

step 110: acquiring a fish-eye lens mapping parameter and a lens field angle;

step 120: acquiring a fitted mapping curve according to the lens mapping parameter;

step 130: acquiring centre coordinate and radius of a fish-eye circle in a fish-eye image;

step 140: creating a blank image for rectifying an image;

step 150: based on the lens field angle, the fitted mapping curve, the centre coordinate and the radius of the fish-eye circle, and a width and a height of the blank image, mapping a point on the blank image used for rectifying the image to a corresponding point in the fish-eye image;

step 160: based on a color sample of the corresponding point in the fish-eye image, drawing same onto the corresponding point in the blank image used for rectifying the image, and drawing the rectified image; and step 170: end of the method for rectifying an image photographed by a fish-eye lens in accordance with an embodiment of the present invention.

In the step 110, the fish-eye lens mapping parameter and the lens field angle can be obtained from the manufacturer of the fish-eye lens.

The step 120, acquiring a fitted mapping curve according to the lens mapping parameter, is that: acquiring the fitted mapping curve by combining the lens mapping parameter with Formula 1.

In the step 130, the center $(X_0, Y_0)$ and the radius 'R' of the fish-eye circle in the fish-eye image are determined, wherein the fish-eye circle is the smallest circle capable of containing all the images in the fish-eye image.

In the step 140, a width W and a height h of the blank image are set according to a size of the image to be rectified, and an aspect ratio of the blank image used for rectifying the image is fov: 180.

The step 150, based on the lens field angle, the fitted mapping curve, the centre coordinate and the radius of the fish-eye circle, and the width and height of the blank image, mapping a point on the blank image used for rectifying the image to a corresponding point in the fish-eye image, further comprises steps of:

step 150a: converting a coordinate (x, y) of a point on the blank image used for rectifying the image to a spherical coordinate $(x_1, y_1, z_1)$ based on the latitude and longitude mapping method;

step 150b: forming a new space coordinate (x', y', z') by rotating the converted spherical coordinate $(x_1, y_1, z_1)$ −90 degrees about the Y axis of the space coordinate; and step 150c: obtaining the coordinate (u, v) mapped in the fish-eye image based on the new space coordinate.

Figure 4:
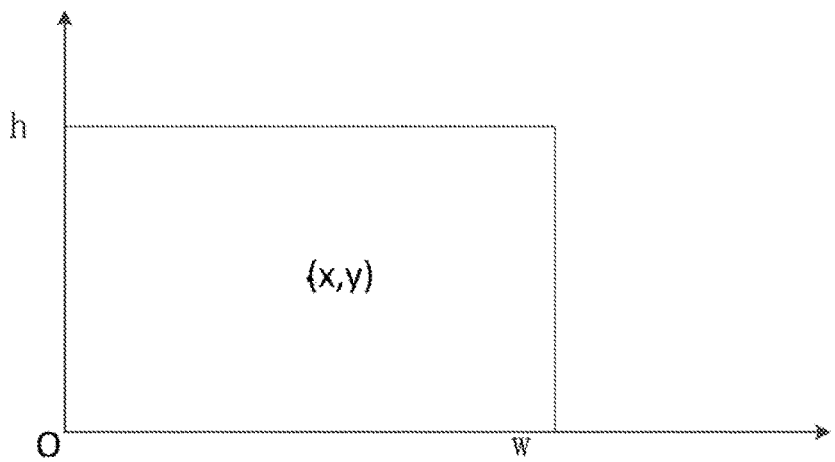
FIG. 4 illustrates a blank image used for rectifying an image of FIG. 2.
Figure 5:
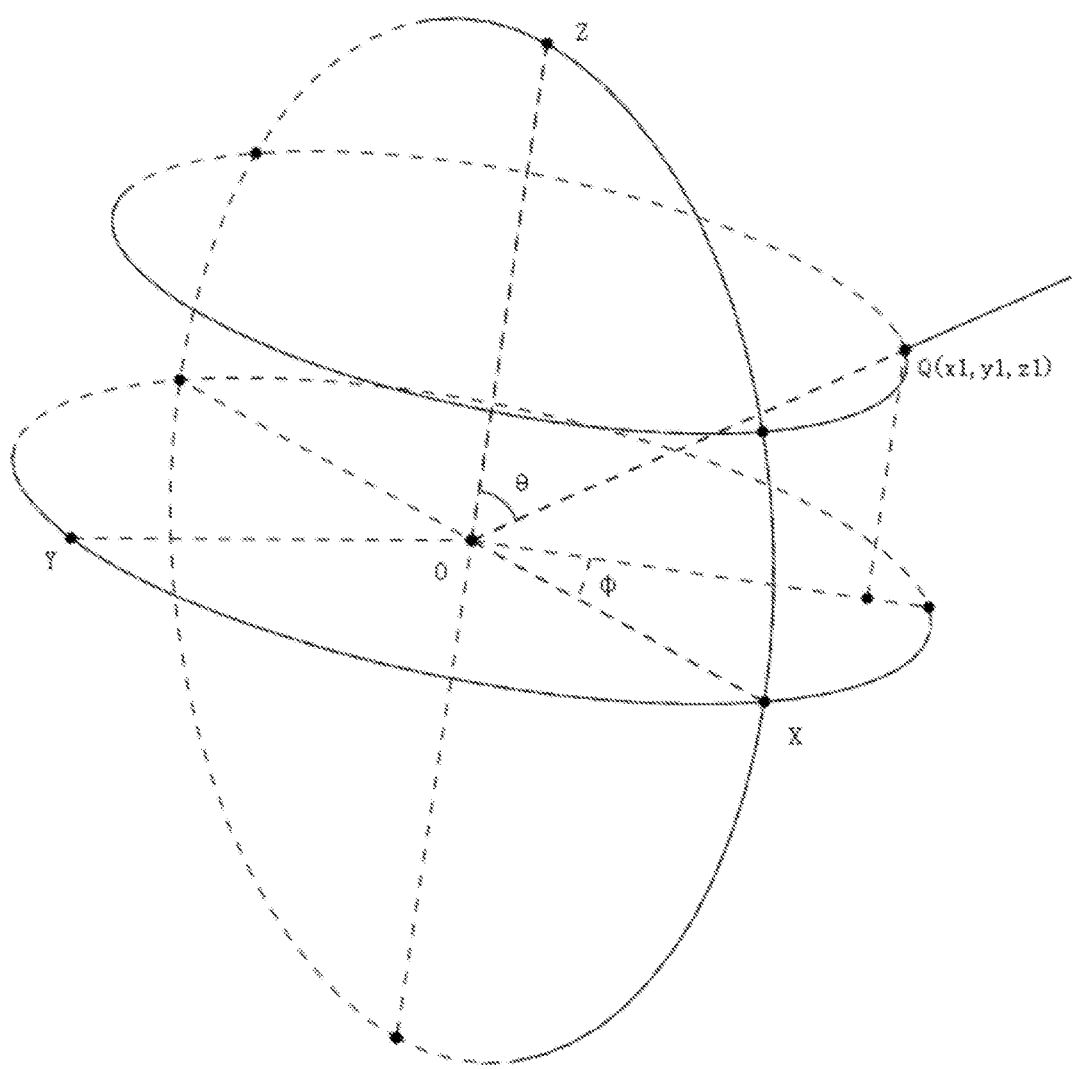
FIG. 5 illustrates a schematic diagram of the coordinate of a point in the blank image for rectifying an image of FIG. 4 converted to the spherical coordinate.

Specifically, FIG. 5 illustrates the coordinate of a point on the blank image used for rectifying the image of FIG. 4 to be converted to the spherical coordinate. In the step 150a, the incident angle θ and the deviation angle φ can be calculated based on the coordinates (x, y) of a point on the blank image used for rectifying the image, the fish-eye lens field angle fov, and the width W and the height h of the blank image, (for example using Formula 3 and Formula 4); and the spherical coordinate $x_1$, $y_1$, and $z_1$ can be calculated based on Formulas 5-7 and the incident angle θ, the deviation angle φ.

$$\theta = y/h \times 7 \quad \text{(Formula 3);}$$

$$\varphi = (x/w \times fov + (360 - fov)/2) \times \pi/180 \quad \text{(Formula 4);}$$

$$x_1 = \sin(\theta)\cos(\varphi) \quad \text{(Formula 5);}$$

$$y_1 = \sin(\theta)\sin(\varphi) \quad \text{(Formula 6);}$$

$$z_1 = \cos(\theta) \quad \text{(Formula 7).}$$

Specifically, in the 150b, the space coordinates x', y' and z' are obtained based on the converted spherical coordinates $x_1$, $y_1$ and $z_1$ and Formula 8:

$$[x', y', z', 1] = [x_1, y_1, z_1, 1] \begin{bmatrix} 0 & 0 & 1 & 0 \\ 0 & 1 & 0 & 0 \\ -1 & 0 & 0 & 0 \\ 0 & 0 & 0 & 1 \end{bmatrix}.$$

Specifically, FIG. 4 illustrates a created blank image used for rectifying the image of FIG. 2. In the step 150c, a converted incident angle θ' and a converted deviation angle φ' can be calculated based on Formulas 9 and 10 and the space coordinates (x', y', z'). The radius 'radius' can be calculated based on the converted incident angle θ', Formula 1, the lens field angle fov, and Formula 11; and the coordinate (u, v) mapped in the fish-eye image can be calculated based on the angle $\varphi'$, the center coordinates $x_0$ and $y_0$ of the fish-eye circle, the radius 'radius', and Formula 12 and Formula 13.

$$\theta' = a\tan(\sqrt{x'^2+y'^2},z')/\pi \times 180 \quad \text{(Formula 9)}$$

$$\varphi' = a\tan(y',x') \quad \text{(Formula 10)}$$

$$radius = R \times F(\theta')/F(fov/2) \quad \text{(Formula 11)}$$

$$u = radius \times \cos(\varphi') + x_0 \quad \text{(Formula 12)}$$

$$v = radius \times \sin(\varphi') + y_0 \quad \text{(Formula 13)}$$

Exemplary Device

The above description combined with FIGS. 2-3 discloses the method for rectifying an image photographed by a fish-eye lens in accordance with the embodiment of the present invention.

Figure 7:
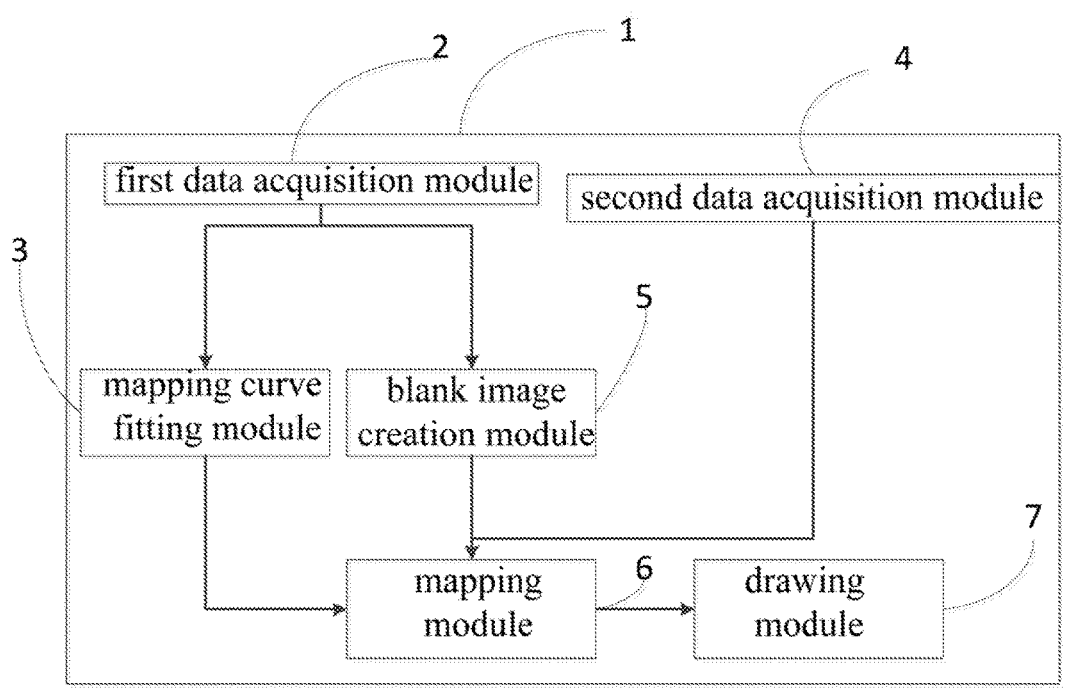
FIG. 7 illustrates a device for rectifying an image photographed by a fish-eye lens in accordance with another embodiment of the present invention.

The following will combine FIG. 7 to describe a device for rectifying an image photographed by a fish-eye lens in accordance with the embodiment of the present invention. FIG. 7 illustrates another embodiment of the present invention of the device for rectifying an image photographed by a fish-eye lens. The device 1 comprises:

a first data acquisition module 2, used for acquiring a fish-eye lens mapping parameter and a lens field angle;

a mapping curve fitting module 3, used for acquiring a fitted mapping curve according to the lens mapping parameter;

a second data acquisition module 4, used for acquiring centre coordinate and radius of a fish-eye circle in a fish-eye image;

a blank image creation module 5, used for creating a blank image used for rectifying the image according to the lens field angle;

a mapping module 6: used for mapping a point on the blank image used for rectifying the image to a corresponding point in the fish-eye image based on the lens field angle, the fitted mapping curve, the centre coordinate and the radius of the fish-eye circle, and the width and height of the blank image; and a drawing module 7: used for drawing same onto the corresponding point in the blank image used for rectifying the image, and drawing the rectified image based on a color sample of the corresponding point in the fish-eye image.

The device for rectifying an image photographed by a fish-eye lens in accordance with another embodiment of the present invention, acquires the fitted mapping curve according to the lens mapping parameter using the acquired mapping parameters combined with Formula 1; wherein $\theta$ is the incident angle, $r_{Real}$ is a distance to a center of a film from where the light at the incident angle $\theta$ is mapped on the film after refracted through a lens.

The device for rectifying an image photographed by a fish-eye lens in accordance with another embodiment of the present invention, acquires the centre coordinate $X_0$ and $Y_0$ and the radius 'R' of the fish-eye circle in a fish-eye image, wherein the fish-eye circle is the smallest circle capable of containing all the images in the fish-eye image.

In the device for rectifying an image photographed by a fish-eye lens in accordance with another embodiment of the present invention, a width W and a height h of the blank image are set according to a size of the image to be rectified, and an aspect ratio of the blank image used for rectifying the image is a fish-eye lens field angle fov: 180.

In the device for rectifying an image photographed by a fish-eye lens in accordance with another embodiment of the present invention, the mapping module further comprises the following conversion modules of:

a first conversion module, used for converting a coordinate (x, y) of a point on the blank image used for rectifying the image to a spherical coordinate ($x_1$, $y_1$, $z_1$) based on the latitude and longitude mapping method;

a second conversion module, used for forming a new space coordinate (x', y', z') by rotating the converted spherical coordinate ($x_1$, $y_1$, $z_1$)–90 degrees about the Y axis of the space coordinate; and a third conversion module, used for obtaining the coordinate (u, v) mapped in the fish-eye image based on the new space coordinate.

In the device for rectifying an image photographed by a fish-eye lens in accordance with another embodiment of the present invention, the first conversion module calculates the incident angle $\theta$ and the deviation angle $\varphi$ based on the coordinates x and y of a point on the blank image used for rectifying the image, the fish-eye lens field angle fov, the width W and the height h of the blank image, and Formula 3 and Formula 4; and calculates the spherical coordinate ($x_1$, $y_1$, $z_1$) based on the angles $\theta$ and $\varphi$ used in Formula 5, Formula 6 and Formula 7.

In the device for rectifying an image photographed by a fish-eye lens in accordance with another embodiment of the present invention, the second conversion module acquires the space coordinates x', y' and z' based on the converted spherical coordinate $x_1$, $y_1$ and $z_1$ and Formula 8.

In the device for rectifying an image photographed by a fish-eye lens in accordance with another embodiment of the present invention, the third conversion module calculates a converted incident angle $\theta'$ and a converted deviation angle $\varphi'$ based on Formula 9 and Formula 10 and the space coordinates x', y', and z'; and calculates the radius 'radius' based on the angle $\theta'$, Formula 1, the lens field angle fov, and Formula 11; and calculates the coordinates u and v mapped in the fish-eye image based on the angle $\varphi'$, the center coordinates $x_0$ and $y_0$ of the fish-eye circle, the radius 'radius', and Formula 12 and Formula 13.

The method and device for rectifying an image photographed by a fish-eye lens of the present invention can rectify the distorted images photographed by the fish-eye lens, so as to form an image with higher precision, and further form a panorama image with higher precision by stitching the rectified images.

Exemplary Device

After the exemplary embodiment of the method and device of the present invention, then, another exemplary embodiment of the device for rectifying an image photographed by a fish-eye lens of the present invention will be described.

The skilled in the art can be understood that, the various aspects of the present invention can be realized as a system, method or program product. Therefore, the various aspects of the present invention can be implemented in the forms of: embodiments of full hardware, embodiments of full software (including firmware and microcode), or embodiments of hardware combined with software, and these can be referred to as 'circuit', 'module' or 'system'.

In some embodiments, the device for rectifying an image photographed by a fish-eye lens in the present invention, can further at least comprise at least one processing unit, and at least one memory unit. The memory unit is stored with program codes, when all the program codes are executed by the processing unit, the processing unit will execute the steps of the method in accordance with the various exemplary embodiments of the present invention as described above in "Exemplary method". For example, the processing unit can execute steps of FIG. 2:

step 110: acquiring a fish-eye lens mapping parameter and a lens field angle;
step 120: acquiring a fitted mapping curve according to the lens mapping parameter;
step 130: acquiring centre coordinate and radius of a fish-eye circle in a fish-eye image;
step 140: creating a blank image for rectifying an image;
step 150: based on the lens field angle, the fitted mapping curve, the centre coordinate and the radius of the fish-eye circle, and the width and height of the blank image, mapping a point on the blank image used for rectifying the image to a corresponding point in the fish-eye image; and
step 160: based on a color sample of the corresponding point in the fish-eye image, drawing same onto the corresponding point in the blank image used for rectifying the image, and drawing the rectified image.

The device 10 for rectifying an image photographed by a fish-eye lens in accordance with the embodiment of the present invention is described with reference to FIG. 8. The device 10 for rectifying an image photographed by a fish-eye lens as shown in FIG. 8 is just an example, will not limit the functions and applications of the embodiments in the present invention.

Figure 8:
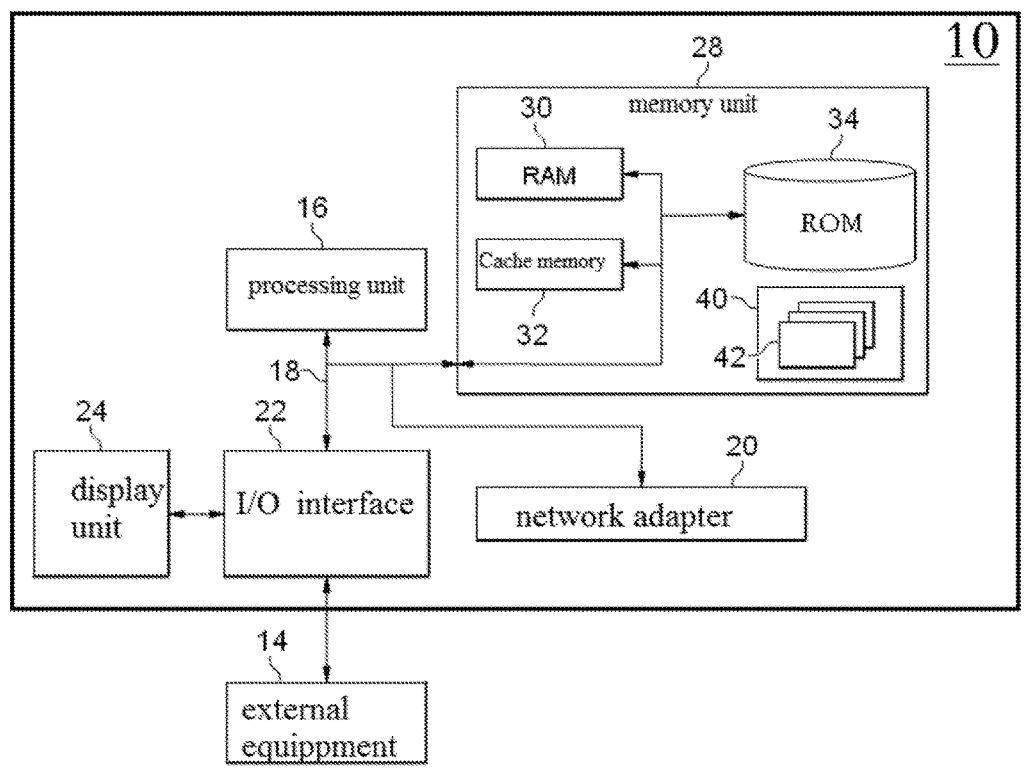
FIG. 8 illustrates a schematic diagram of the device for rectifying an image photographed by a fish-eye lens in accordance with an embodiment of the present invention.

As shown in FIG. 8, the device 10 for rectifying an image photographed by a fish-eye lens is a universal computing device. The device 10 for rectifying an image photographed by a fish-eye lens comprises such components but not limited to: the at least one processing unit 16, the at least one memory unit 28, and a main Bus 18 for connecting different components (including the memory unit 28 and the processing unit 16) of the system.

Bus 18 is one or more of several Bus structures, and comprises memory Bus or memory controller, peripheral Bus, Accelerated Graphics Port, processor, or Locus Bus of any of various Bus structures.

The memory unit 28 may comprises a readable medium in a form of volatile memory, such as random access memory (RAM) 30 and/or Cache memory 32, and can further comprises Read-Only Memory (ROM) 34.

The memory unit 28 can further comprises programs/utilities 40 with a sets of (at least one) program modules 42 thereof. Such program modules 42 can comprise but not limited to: operation system, one or more application programs, other program modules and program data. Each or some combination of these examples may include implementation based on network environment.

The device 10 for rectifying an image photographed by a fish-eye lens can also communicate with one or more external equipments (such as keyboards, pointing devices, Bluetooth devices, etc.), and also communicate with one or more user interaction devices to the device 10 for rectifying an image photographed by a fish-eye lens, and/or communicate with any other devices (such as router, modem etc.) which enables the device 10 for rectifying an image photographed by a fish-eye lens to communicates with one or more other computing devices. Such communication can be carried out through input/output (I/O) interface 22. Further, the device 10 for rectifying an image photographed by a fish-eye lens can communicate with one or more networks (e.g. local area networks (LAN), wide area networks (WAN) and/or public networks, such as the Internet) through a network adapter 20. As shown in the figures, the network adapter 20 communicates with other modules of the device 10 for rectifying an image photographed by a fish-eye lens through the Bus 18. It is understood that, although not shown in the figures, the device 10 for rectifying an image photographed by a fish-eye lens can be combined with other hardware or software modules, comprising but not limited: microcode, device driver, redundant processing unit, external disk drive arrays, RAID system, tape drives, and data backup storage system.

Exemplary Program Products

In some embodiment, the aspects of the present invention can also be implemented as a form of program product, comprising program codes. When the program product runs on a terminal device, the program codes are used for the terminal device to execute the steps of the method in accordance with the various exemplary embodiments of the present invention as described above in "Exemplary method". For example, the terminal can executes as shown in FIG. 2:

step 110: acquiring a fish-eye lens mapping parameter and a lens field angle;
step 120: acquiring a fitted mapping curve according to the lens mapping parameter;
step 130: acquiring centre coordinate and radius of a fish-eye circle in a fish-eye image;
step 140: creating a blank image for rectifying an image;
step 150: based on the lens field angle, the fitted mapping curve, the centre coordinate and the radius of the fish-eye circle, and the width and height of the blank image, mapping a point on the blank image used for rectifying the image to a corresponding point in the fish-eye image; and
step 160: based on a color sample of the corresponding point in the fish-eye image, drawing same onto the corresponding point in the blank image used for rectifying the image, and drawing the rectified image.

The program product can use one or any combination of multiple readable medium. The readable medium can be a readable signal medium or a readable storage medium. The readable storage medium can be, for example, but not limited to, electrical, magnetic, optical, electromagnetic, infrared, or semiconductor systems, devices, or apparatus; or any combination thereof. The readable storage medium, as more specific examples (non-exhaustive list), comprises: an electric connection with one or more wires, portable disk, hard disk, Random Access Memory (RAM), Read-Only Memory (ROM), Erasable Programmable Read-Only Memory (EPROM or flash memory), optical fiber, Portable Compact Disk Read-Only Memory (CD-ROM), Optical memory devices, magnetic memory devices, or any applicable combination thereof.

Figure 9:
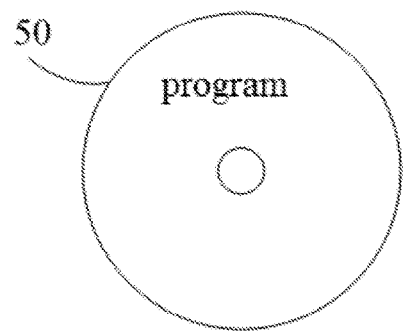
FIG. 9 schematically illustrates a program product.

As shown in FIG. 9, the program product 50 in accordance with an embodiment of the present invention, can use the Portable Compact Disk Read-Only Memory (CD-ROM) containing program codes, and can run on the terminal device such as a personal computer. But the program product of the present invention is not limited to this. In the present invention, the readable storage medium can be any physical medium containing or stored program, the program can be executed or combined in use by an instruction performed system, device or apparatus.

The readable signal medium can comprise data signal propagated in a baseband or as a part of the carrier wave, in which carries readable program code. The data signal in such propagation way can take a variety of forms, comprising but not limited to: electromagnetic signal, optical signal or any suitable combination thereof. The readable signal medium can also be any readable medium other than a readable storage medium. The readable medium can send, propagate, or transmit such program to the instruction performed system, device, or apparatus for use.

The program code carried in the readable medium can be transmitted via any suitable medium, comprising but not limited to: wireless, wired, optical cable, RF, etc., or any appropriate combination thereof.

The program code executed in the present invention can be written in one or any combination of more programming languages. Such programming languages comprises Object Oriented Program language, such as Java, C++ etc.; and also comprise common procedural programming language, such as "C" or the like. The program code can be completely executed on the user computing device, partly executed on the user equipment, executed as an independent software package, executed partly on the user computing device and partly on the remote computing device, or completely executed on the remote computing device or server. As for the situation of the remote computing device, the remote computing device can be connected to the user computing device via any network, comprising Local Area Network (LAN) or Wide Area Network (WAN); or, can be connected to the external computing device (e.g. via internet provided from the internet service providers).

It should be noted that, although the above describe the device or sub-device for rectifying an image photographed by a fish-eye lens in detail, such division is not compulsory. Actually, according to the embodiments of the present invention, the features and functions of two or more devices described above can be embodied in one device. And vice versa the characteristics and functions of one device described above can be further divided into multiple devices.

Additionally, the steps of the method of the present invention are illustrated in a particular order in the drawings, however, it is not required or indicated that these steps must be performed in the particular order, or must be completely performed to achieve the desired result. Additionally or alternatively, some steps can be omitted, multiple steps can be merged into one step, and/or one step can be divided into multiple steps.

Although the spirit and principles of the present invention have been described in several embodiments, it is understood, the present invention should not be limited to the described embodiments, nor does the division of the various aspects mean that the features in these aspects cannot be combined to benefit, and such division is only for the convenience of expression. Spirit of variations or modifications made to the equivalent, should be covered within the scope of the present invention.

What is claimed is:

1. A method for rectifying an image photographed by a fish-eye lens, comprising steps of:
   acquiring a fish-eye lens mapping parameter and a lens field angle;
   acquiring a fitted mapping curve according to the lens mapping parameter;
   acquiring centre coordinate and radius of a fish-eye circle in a fish-eye image;
   creating a blank image used for rectifying the image according to the lens field angle;
   based on the lens field angle, the fitted mapping curve, the centre coordinate and the radius of the fish-eye circle, and a width and height of the blank image, mapping a point on the blank image used for rectifying the image to a corresponding point in the fish-eye image; and
   based on a color sample of the corresponding point in the fish-eye image, drawing same onto the corresponding point in the blank image used for rectifying the image, and drawing the rectified image.

2. The method for rectifying an image photographed by a fish-eye lens of claim 1, wherein, in the step of acquiring a fitted mapping curve according to the lens mapping parameter, the fitted mapping curve is acquired via combining the acquired mapping parameter with Formula 1: $r_{Real}=F(\theta)=1.0\times10^{-9}\theta^4-6.0\times10^{-7}\theta^3+8.5\times10^{-6}\theta^2+0.0183\theta+0.0007$, wherein $\theta$ is an incident angle, $r_{Real}$ is a distance to a center of a film from where the light at the incident angle $\theta$ is mapped on the film after refracted through a lens.

3. The method for rectifying an image photographed by a fish-eye lens of claim 1, wherein, in the step of acquiring centre coordinate and radius of a fish-eye circle in a fish-eye image: the centre coordinate $X_0$ and $Y_0$ and the radius 'R' of the fish-eye circle in a fish-eye image are acquired, wherein the fish-eye circle is the smallest circle capable of containing all images in the fish-eye image.

4. The method for rectifying an image photographed by a fish-eye lens of claim 1, wherein, in the step of creating a blank image used for rectifying the image according to the lens field angle:
   the width w and the height h of the blank image are set according to a size of the image to be rectified, and an aspect ratio of the blank image used for rectifying the image is a fish-eye lens field angle fov:180.

5. The method for rectifying an image photographed by a fish-eye lens of claim 1, wherein, the step of based on the lens field angle, the fitted mapping curve, the centre coordinate and the radius of the fish-eye circle, and the width and height of the blank image, mapping a point on the blank image used for rectifying the image to a corresponding point in the fish-eye image, further comprises steps of:
   step 5a: converting a coordinate (x, y) of a point on the blank image used for rectifying the image to a spherical coordinate $(x_1, y_1, z_1)$ based on the latitude and longitude mapping method;
   step 5b: forming a new space coordinate (x', y', z') by rotating the converted spherical coordinate $(x_1, y_1, z_1)$ −90 degrees about Y axis of the space coordinate; and
   step 5c: obtaining a coordinate (u, v) mapped in the fish-eye image based on the new space coordinate.

6. The method for rectifying an image photographed by a fish-eye lens of claim 5, wherein, in the step 5a, an incident angle $\theta$ and a deviation angle $\varphi$ are calculated based on the coordinates x and y of a point on the blank image used for rectifying the image, the fish-eye lens field angle fov, the width w and the height h of the blank image, Formula 3: $\theta=y/h\times\pi$, and Formula 4: $\varphi=(x/w\times fov+(360-fov)/2)\times\pi/180$;
   the spherical coordinate $(x_1, y_1, z_1)$ is calculated based on the incident angle $\theta$, the deviation angle $\varphi$, Formula 5: $x_1=\sin(\theta)\cos(\varphi)$, Formula 6: $y_1=\sin(\theta)\sin(\varphi)$, and Formula 7: $z_1=\cos(\theta)$.

7. The method for rectifying an image photographed by a fish-eye lens of claim 5, wherein, in the step 5b, the space coordinates x', y' and z' are obtained based on the converted spherical coordinates $x_1$, $y_1$ and $z_1$ and Formula 8:

$$[x', y', z', 1] = [x_1, y_1, z_1, 1]\begin{bmatrix} 0 & 0 & 1 & 0 \\ 0 & 1 & 0 & 0 \\ -1 & 0 & 0 & 0 \\ 0 & 0 & 0 & 1 \end{bmatrix}.$$

8. The method for rectifying an image photographed by a fish-eye lens of claim 7, wherein, in the step 5c, a converted incident angle θ' and a converted deviation angle φ' are calculated based on:

$$\theta'=a\tan(\sqrt{x'^2+y'^2},z')/\pi \times 180; \text{ and} \quad \text{Formula 9:}$$

$$\varphi'=a\tan(y',x') \text{ and the space coordinates } (x',y',z'); \quad \text{Formula 10:}$$

a radius 'radius' is calculated based on the converted incident angle θ', Formula 1, the lens field angle fov, and Formula 11:

$$\text{radius}=R\times F(\theta')/F(fov/2);$$

the coordinates u and v mapped in the fish-eye image are calculated based on the angle φ', the center coordinates $x_0$ and $y_0$ of the fish-eye circle, the radius 'radius';

$$u=\text{radius}\times\cos(\varphi')+x_0; \text{ and} \quad \text{Formula 12:}$$

$$v=\text{radius}\times\sin(\varphi')+y_0 \quad \text{Formula 13.}$$

9. The method for rectifying an image photographed by a fish-eye lens of claim 1, wherein, the fish-eye lens mapping parameter and the lens field angle can be obtained from the manufacturer of the fish-eye lens.

10. The method for rectifying an image photographed by a fish-eye lens of claim 1, wherein, the steps executed by at least one processing unit processing unit and stored in at least one memory unit, comprises:
  acquiring centre coordinate and radius of a fish-eye circle in a fish-eye image;
  creating a blank image used for rectifying the image according to the lens field angle;
  based on the lens field angle, the fitted mapping curve, the centre coordinate and the radius of the fish-eye circle, and a width and height of the blank image, mapping a point on the blank image used for rectifying the image to a corresponding point in the fish-eye image; and
  based on a color sample of the corresponding point in the fish-eye image, drawing same onto the corresponding point in the blank image used for rectifying the image, and drawing the rectified image.

11. A device for rectifying an image photographed by a fish-eye lens, wherein, comprising:
  a first data acquisition module, used for acquiring a fish-eye lens mapping parameter and a lens field angle;
  a mapping curve fitting module, used for acquiring a fitted mapping curve according to the lens mapping parameter;
  a second data acquisition module, used for acquiring centre coordinate and radius of a fish-eye circle in a fish-eye image;
  a blank image creation module, used for creating a blank image used for rectifying the image according to the lens field angle;
  a mapping module, used for based on the lens field angle, the fitted mapping curve, the centre coordinate and the radius of the fish-eye circle, and a width and height of the blank image, mapping a point on the blank image used for rectifying the image to a corresponding point in the fish-eye image; and
  a drawing module, used for based on a color sample of the corresponding point in the fish-eye image, drawing same onto the corresponding point in the blank image used for rectifying the image, and drawing the rectified image.

12. The device of claim 11, wherein, the fitted mapping curve is acquired according to the lens mapping parameter via combining the acquired mapping parameter with Formula 1: $r_{Real}=F(\theta)=1.0\times10^{-9}\theta^4-6.0\times10^{-7}\theta^3+8.5\times10^{-6}\theta^2+0.01830+00007$ wherein θ is an incident angle, $r_{Real}$ is a distance to a center of a film from where the light at the incident angle θ is mapped on the film after refracted through a lens.

13. The device of claim 11, wherein, the centre coordinate $X_0$ and $Y_0$ and the radius 'R' of the fish-eye circle in a fish-eye image are acquired, wherein the fish-eye circle is the smallest circle capable of containing all images in the fish-eye image.

14. The device of claim 11, wherein, the width w and the height h of the blank image are set according to a size of the image to be rectified, and an aspect ratio of the blank image used for rectifying the image is a fish-eye lens field angle fov: 180.

15. The device of claim 11, wherein, a mapping module comprises modules of:
  a first conversion module, used for converting a coordinate (x, y) of a point on the blank image used for rectifying the image to a spherical coordinate ($x_1$, $y_1$, $z_1$) based on the latitude and longitude mapping method;
  a second conversion module, used for forming a new space coordinate (x', y', z) by rotating the converted spherical coordinate ($x_1$, $y_1$, $z_1$)–90 degrees about Y axis of the space coordinate; and
  a third conversion module, used for obtaining a coordinate (u, v) mapped in the fish-eye image based on the new space coordinate.

16. The device of claim 15, wherein, the first conversion module calculates the incident angel θ and the deviation angle φ based on the coordinates x and y of a point on the blank image used for rectifying the image, the fish-eye lens field angle fov, the width w and height h of the blank image, Formula 3: $\theta=y/h\times n$ and Formula 4: $\varphi=(x/w\times fov+(360-fov)/2)\times\pi/180$; and calculates the spherical coordinates $x_1$, $y_1$, and $z_1$ based on the angles θ and φ, and using Formula 5: $x_1=\sin(\theta)\cos(\varphi)$, Formula 6: $y_1=\sin(\theta)\sin(\varphi)$ and Formula 7: $z_1=\cos(\theta)$.

17. The device of claim 15, wherein, the second conversion module acquires the space coordinates x', y' and z' based on the converted spherical coordinate $x_1$, $y_1$ and $z_1$ and Formula 8:

$$[x', y', z', 1] = [x_1, y_1, z_1, 1]\begin{bmatrix} 0 & 0 & 1 & 0 \\ 0 & 1 & 0 & 0 \\ -1 & 0 & 0 & 0 \\ 0 & 0 & 0 & 1 \end{bmatrix}.$$

18. The device of claim 17, wherein, the third conversion module calculates a converted incident angel θ' and a converted deviation angle φ' based on Formula 9: $\theta'=a\tan(\sqrt{x'^2+y'^2},z')/\pi\times180$, Formula 10: $\varphi'=a\tan(y',x')$ and the space coordinates x', y', and z';
  calculates the radius "radius" based on the angle θ', Formula 1, the lens field angle fov, and Formula 11: radius=$R\times F(\theta'')/F(fov/2)$; and
  calculates the coordinates u and v mapped in the fish-eye image based on the angle φ', the center coordinates $x_0$ and $y_0$ of the fish-eye circle, the radius 'radius', and Formula 12: $u=\text{radius}\times\cos(\varphi')+x_0$, Formula 13: $v=\text{radius}\times\sin(\varphi')+y_0$.

19. The device for rectifying an image photographed by a fish-eye lens of claim 11, wherein, the device for rectifying an image photographed by a fish-eye lens is a computing device, comprises at least one processing unit, the at least one memory unit, and a main Bus connecting the memory unit with the processing unit; the memory unit containing the modules.

20. A non-transitory computer readable medium containing executable program instructions for rectifying an image photographed by a fish-eye lens, the program instructions comprise program instructions for:
  acquiring a fish-eye lens mapping parameter and a lens field angle;
  acquiring a fitted mapping curve according to the lens mapping parameter;
  acquiring centre coordinate and radius of a fish-eye circle in a fish-eye image;
  creating a blank image used for rectifying the image according to the lens field angle;
  based on the lens field angle, the fitted mapping curve, the centre coordinate and the radius of the fish-eye circle, and the width and height of the blank image, mapping a point on the blank image used for rectifying the image to a corresponding point in the fish-eye image; and
  based on a color sample of the corresponding point in the fish-eye image, drawing same onto the corresponding point in the blank image used for rectifying the image, and drawing the rectified image.

\* \* \* \* \*